United States Patent [19]

Diebel

[11] 4,329,243

[45] May 11, 1982

[54] CAVITATION-INHIBITING, NONFREEZING, COOLING AND/OR HEAT-TRANSFER FLUIDS

[75] Inventor: Klaus Diebel, Marl, Fed. Rep. of Germany

[73] Assignee: Chemische Werke Huels Aktiengesellschaft, Marl, Fed. Rep. of Germany

[21] Appl. No.: 198,379

[22] Filed: Oct. 20, 1980

[30] Foreign Application Priority Data

Oct. 24, 1979 [DE] Fed. Rep. of Germany ....... 2942903

[51] Int. Cl.$^3$ .......................... C09K 5/00; C23F 11/10
[52] U.S. Cl. ......................................... 252/75; 252/76; 252/78.5; 252/79
[58] Field of Search .................... 252/71, 75, 76, 78.1, 252/78.5, 79, 389 A, 392

[56] References Cited

U.S. PATENT DOCUMENTS

| | | | |
|---|---|---|---|
| 3,133,787 | 5/1964 | Kelley | 252/75 X |
| 3,282,846 | 11/1966 | Scott | 252/75 |
| 3,607,757 | 9/1971 | McDonald | 252/75 |
| 3,837,803 | 9/1974 | Carter et al. | 21/2.7 |
| 3,935,125 | 1/1976 | Jacob | 252/389 A |
| 4,076,501 | 2/1978 | Harris et al. | 21/2.7 A |

FOREIGN PATENT DOCUMENTS 942489 2/1974 Canada .
9843 8/1975 Japan .

Primary Examiner—P. E. Willis, Jr.
Attorney, Agent, or Firm—Millen & White

[57] ABSTRACT

A Cavitation-inhibiting, nonfreezing, cooling and/or heat-transfer liquid, comprising a glycol and a cavitation inhibiting effective amount of at least one phosphonic acid of the formula

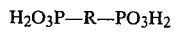

$$H_2O_3P\text{—}R\text{—}PO_3H_2$$

wherein
R is phenylene or $C_{1-6}$-alkylene each optionally substituted by hydroxy, amino or $PO_3H_2$ groups, or of the formula

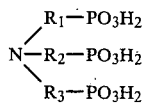

wherein $R_1$, $R_2$, and $R_3$ each independently is a $C_{1-4}$-alkylene group or such a group whose carbon atom chain contains one or more N atoms each of which is attached to one or two groups of the formulae $R_1$—$PO_3H_2$, $R_2$—$PO_3H_2$ or $R_3$—$PO_3H_2$ as defined above.

9 Claims, No Drawings

CAVITATION-INHIBITING, NONFREEZING, COOLING AND/OR HEAT-TRANSFER FLUIDS

BACKGROUND OF THE INVENTION

The metallic materials of industrial cooling and/or heat-transfer systems, especially in internal combustion engines, are subject to chemical and mechanical stresses when aqueous, glycol-containing heat-transfer or cooling media are used. These produce more or less grave damage to the material, i.e. corrosion and cavitation. The degree of damage depends on the quality of the metals, the cooling fluid, the heat-transfer fluid, and on the external conditions of the cooling cycle. The damage to the material can be effectively combated and reduced by adding suitable inhibitors to the functional fluids, but can be entirely prevented only in the rarest cases. Preferred corrosion-protecting agents are benzoates, borax, nitrites and, occasionally, also phosphates. The effect of the inhibitors is specific and normally is restricted to one metal group when used within a limited concentration range. As the metals are exposed to increased stress, for example due to cavitation, the inhibitors may in certain cases lose their beneficial protective effect and increased damage to the materials will ensue. In these cases, the damage to certain metals, for example aluminum, can be higher than that which would have occurred in the absence of any inhibitor ingredient.

Due to conditions of construction, cavitation damage is primarily observed on components made of cast iron and aluminum, e.g., on pumps. Such damage occurs predominantly in cooling systems for internal combustion engines. In addition to the water pump, also endangered are the cylinder liners, parts of the crankcase, radiators, and other components. Accordingly, principally, cast iron and aluminum and its alloys are to be protected against cavitation. The conventional corrosion-protecting additives are suitable for this purpose only in exceptional cases.

Borate-nitrite mixtures have a cavitation-inhibiting effect in water with respect to gray cast iron. However, in glycol-water mixtures, this inhibitor combination results in increased erosion of aluminum. Inhibition with sodium benzoate and sodium nitrite or sodium nitrate likewise still permits unduly high cavitation erosions on aluminum and its alloys. Moreover, these formulations are sensitive to certain chemicals, such as, for example, sodium carbonate, which are frequently utilized to set a minimum alkalinity of the coolants and for protection against superacidification.

Cavitation-inhibiting cooling liquids for diesel engines are known from DAS's [German Published Applications] Nos. 1,239,137 and 1,263,398. They contain polyalkylene glycols or polyoxethylates of alcohols, carboxylic acids or carboxylic acid amides. Cavitation-inhibiting cooling fluids for internal combustion engines are also known from DAS No. 1,239,138. These contain polyvinylpyrrolidone.

However, the prior art additives are effective only on gray cast iron and, even in this case, only when used in comparatively high concentrations (0.1–5% by weight). These additives are practically ineffective on aluminum, as will be demonstrated below by comparative tests (Table 1). This is especially disadvantageous since it remains a prime objective to improve cavitation protection of aluminum and aluminum alloys in view of the increased usage of these light metals in engine construction and in heat-transfer e.g., (solar) installations.

SUMMARY OF THE INVENTION

Accordingly, it is an object of this invention to provide cavitation inhibiting agents for use in cooling and/or heat-transfer media, which agents are free from the foregoing disadvantages and are useful with aluminum-containing materials.

Upon further study of the specification and appended claims, further objects and advantages of this invention will become apparent to those skilled in the art.

These objects have been attained by providing cavitation-inhibiting, nonfreezing, cooling and heat-transfer liquids comprising a glycol and 0.005–0.2% by weight, based on the weight of glycol, of at least one phosphonic acid of formula I

$$H_2O_3P-R-PO_3H_2 \qquad (I)$$

wherein
R is phenylene or $C_{1-6}$-alkylene, each optionally substituted by one or more hydroxy, amino or $PO_3H_2$ groups, or of the formula II

$$\begin{array}{l} \phantom{N}\diagup R_1-PO_3H_2 \\ N-R_2-PO_3H_2 \\ \phantom{N}\diagdown R_3-PO_3H_2 \end{array} \qquad (II)$$

wherein $R_1$, $R_2$, and $R_3$ each independently is $C_{1-4}$-alkylene or such a group containing nitrogen atoms.

These solutions generally are based on glycols in water and contain a conventional corrosion inhibitor.

DETAILED DISCUSSION

The number of substituents on the R groups of formula I may generally be 1–2 for the aryl moieties and 1–2 for the alkylene moieties. The alkylene moieties may be straight chain or branched and the substituents may be in any position. The preferred alkylene moieties include those containing a substituent on the 1-position, preferably hydroxy, and also containing both phosphonic acid moieties on the 1-position. $R_1$, $R_2$ and $R_3$ alkylene groups are generally straight chain moieties. These carbon atom chains can contain nitrogen atoms (e.g., 1–3) each of which is attached to one or two groups of the formulae $R_1-PO_3H_2$, $R_2-PO_3H_2$ or $R_3-PO_3H_2$ defined above.

Examples of suitable phosphonic acids which can be used in the cavitation-inhibiting cooling and heat-transfer liquids of this invention include: for formula (I), tetramethylene-1,4-diphosphonic acid, hexamethylene-1,6-diphosphonic acid, benzene-1,4-diphosphonic acid, 1-hydroxyethane-1,1-diphosphonic acid, 1-hydroxypropane-1,1-diphosphonic acid, aminomethane-1,1-diphosphonic acid, aminoethane-1,1-diphosphonic acid, and aminobutane-1,1-diphosphonic acid; and for formula (II), aminotris (methylenephosphonic acid), ethylenediaminotetra (methylenephosphonic acid), and diethylenetriaminopenta (methylenephosphonic acid).

These compounds can be prepared according to generally known methods as described, for example, inter alia, in Houben-Weyl, "Methoden der organischen Chemie" [Methods of Organic Chemistry] 12/1 (1963) whose disclosure is incorporated by reference herein.

In a preferred embodiment of this invention, the cavitation inhibiting cooling liquids contain aminotris (methylenephosphonic acid) as the phosphonic acid.

Preferably, the cavitation-inhibiting cooling liquids contain 0.01–0.06% by weight of the phosphonic acid. These phosphonic acids display optimum protective effects in a concentration of even below 0.05% by weight, based on the weight of glycol in the liquids, which is an unusually low concentration for inhibitors.

Suitable glycols for use in the glycol-water mixtures of this invention include, above all, ethylene glycol and propylene glycol. It is moreover also possible to employ higher glycols, e.g. diethylene or dipropylene glycol. The glycols can be utilized individually or in mixtures. They are usually used in their conventional concentrations of 10–60% by weight, based on the total weight of the water and the glycol components.

The corrosion inhibitors (protective agents) which can be employed include the conventional and popular compounds such as sodium benzoate, borax, sodium nitrite, sodium phosphates, sodium carbonate, sodium nitrate, sodium silicate, as well as organic nitrogen or sulfur compounds in the combinations customary for these compounds. The conventional quantities of these agents can be employed, e.g., generally 2–5 wt % based on the amount of glycol.

Especially well recommended corrosion-protective agent recipes are the following (based on the amount of glycol): sodium benzoate (2–3%), borax (0.5–2%), sodium nitrite (0.1–0.5%), sodium nitrate (0.1–0.5%), as well as sodium silicate (0.05–0.2%), and an effective amount of a nonferrous metal protective inhibitor.

As demonstrated by the following examples, the cooling liquids of this invention effect a reduction in cavitation by 20–55%.

Moreover, the additives of this invention provide marked cavitation-inhibiting effects of between 22% and 70% in all commercially available products useful for a great variety of special purposes. In other words, the phosphonic acids, in very small concentrations, improve the resistance to cavitation erosion of already good formulations and reduce the degree of erosion caused by presently used inferior formulations to values of a good formulation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

The determination of the amounts eroded by cavitation was in accordance with the guidelines of the standardized testing method according to "Forschungsvereinigung fuer Verbrennungskraftmaschinen e.V." [Research Association for Internal Combustion Engines] (leaflet R 315, 1977) using an ultrasonic vibrator. The testing material was an aluminum alloy, AlCuMg2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

TABLE 1

| Cavitation Test: | Frequency | 20 kHz | Test Specimen: AlCuMg2 | | | | | |
|---|---|---|---|---|---|---|---|---|
| | Vibration Amplitude | 20 μm | Water Hardness: 10° dGH | | | | | |
| | Testing Temperature | 80° C. | | | | | | |
| Formulation | | 1 | 2 | 3 | 4 | 5 | 6 | 7 | 8 |

| Formulation | 1 | 2 | 3 | 4 | 5 | 6 | 7 | 8 |
|---|---|---|---|---|---|---|---|---|
| Aminotris (methylenephosphonic acid) % | — | 0.01 | — | — | 0.01 | — | — | — |
| Hydroxyethane-1,1-diphosphonic acid % | — | — | 0.01 | — | — | — | — | 0.01 |
| Sodium benzoate % | 2.5 | 2.5 | 2.5 | 2.5 | 2.5 | 2.5 | 2.5 | 2.5 |
| Borax % | 2 | 2 | 2 | — | — | — | — | — |
| Sodium nitrite % | 0.2 | 0.2 | 0.2 | 0.3 | 0.3 | 0.3 | 0.3 | 0.3 |
| Sodium nitrate % | — | — | — | — | — | — | — | — |
| Sodium carbonate % | — | — | — | 0.4 | 0.4 | 0.4 | 0.4 | 0.4 |
| Nonferrous metal protection % | — | — | — | — | — | — | — | — |
| Polyethylene glycol 1,000 % | — | — | — | — | — | 1 | — | — |
| Polypropylene glycol 1,000 % | — | — | — | — | — | — | 1 | — |
| Test Result | | | | | | | | |
| 20% Aqueous solution** | | | | | | | | |
| Amount eroded (mg/h) | 26 | 10.5 | 12 | 106 | 50 | 166 | 125 | 76 |
| Test specimen* | s | h | 1 | s | h | s | s | d |
| 10% Aqueous solution** | | | | | | | | |
| Amount eroded (mg/h) | 51 | 24 | | | | | | |
| Test specimen* | s | 1 | | | | | | |

TABLE 2

| Cavitation Test: | Frequency | 20 kHz | Test Specimen AlCuMg2 | | | | | | |
|---|---|---|---|---|---|---|---|---|---|
| | Vibration Amplitude | 20 μm | Water Hardness 10° dGH | | | | | | |
| | Testing Temperature | 80° C. | | | | | | | |
| Formulation | | 9 | 10 | 11 | 12 | 13 | 14 | 15 | 16 | 17 |

| Formulation | 9 | 10 | 11 | 12 | 13 | 14 | 15 | 16 | 17 |
|---|---|---|---|---|---|---|---|---|---|
| Aminotris (methylenephosphonic acid) % | — | 0.01 | 0.01 | — | 0.01 | — | — | 0.01 | — |
| Hydroxyethane-1,1-diphosphonic acid % | — | — | — | — | — | 0.01 | — | — | 0.01 |
| Sodium benzoate % | 2.5 | 2.5 | 2.5 | 2.5 | 2.5 | 2.5 | 2.5 | 2.5 | 2.5 |
| Borax % | 2 | 2 | 2 | 2 | 2 | 2 | 2 | 2 | 2 |
| Sodium nitrite % | — | — | — | — | — | — | 0.2 | 0.2 | 0.2 |
| Sodium nitrate % | 0.3 | 0.3 | 0.3 | 0.3 | 0.3 | 0.3 | 0.2 | 0.2 | 0.2 |
| Sodium carbonate % | — | — | 0.1 | — | — | — | — | — | — |

TABLE 2-continued

| Cavitation Test: | Frequency | 20 kHz | Test Specimen AlCuMg2 | | | | | | |
|---|---|---|---|---|---|---|---|---|---|
| | Vibration Amplitude | 20 μm | Water Hardness 10° dGH | | | | | | |
| | Testing Temperature | 80° C. | | | | | | | |
| Formulation | | 9 | 10 | 11 | 12 | 13 | 14 | 15 | 16 | 17 |
| Sodium silicate % | | — | — | — | — | — | — | 0.05 | 0.05 | 0.05 |
| Nonferrous metal protection % | | — | — | 0.1 | 0.15 | 0.15 | 0.15 | 0.1 | 0.1 | 0.1 |
| Test Result | | | | | | | | | | |
| 20% Aqueous solution** | | | | | | | | | | |
| Amount eroded (mg/h) | | 27 | 14 | 13.5 | 26 | 14 | 14.5 | 1145 | 9.5 | 11 |
| Test specimen* | | d | h | h | d | h | 1 | d | 1 | d |
| 10% Aqueous solution** | | | | | | | | | | |
| Amount eroded (mg/h) | | | | | | | | 13.5 | 12 | 11 |
| Test specimen* | | | | | | | | s | d | s |

For Tables 1 and 2:
*the visual evaluation of the test specimens was accoridng to the following scale:
h = bright-colored, no change in coloration
1 = slight tarnish spots
d = dark tarnish
s = black
**of inhibited ethylene glycol.

What is claimed is:

1. A cavitation-inhibiting, nonfreezing, cooling and/or heat-transfer liquid, consisting essentially of water, a glycol, a cavitation inhibiting effective amount of at least one phosphonic acid of the formula $$H_2O_3P-R-PO_3H_2$$

wherein
R is phenylene, $C_{1-6}$-alkylene, or phenylene or $C_{1-6}$-alkylene substituted by hydroxy, amino or $PO_3H_2$ groups, or of the formula,

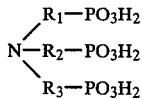

wherein $R_1$, $R_2$, and $R_3$ each independently is a $C_{1-4}$-alkylene group or such a group whose carbon atom chain contains one or more N atoms each of which is attached to one or two groups of the formulae $R_1-PO_3H_2$, $R_2-PO_3H_2$ or $R_3-PO_3H_2$ as defined above,
and a corrosion inhibitor which is sodium benzoate, borax, sodium nitrite, a sodium phosphate, sodium carbonate, sodium nitrate, sodium silicate or a sulfur compound.

2. The liquid of claim 1 wherein the content of glycol is 10–60 wt % based on the total weight of water and glycol.

3. The liquid of claim 1 wherein the amount of phosphonic acid is 0.005–0.2% by weight based on the weight of glycol.

4. A liquid of claim 3, containing 0.01–0.06% by weight of the phosphonic acid on the same basis.

5. A liquid of claim 1 or 4, wherein the phosphonic acid is aminotris (methylenephosphonic acid).

6. A cavitation-inhibiting, nonfreezing, cooling and/or heat-transfer liquid, comprising water, a glycol and a cavitation inhibiting effective amount of at least one phosphonic acid of the formula $$H_2O_3P-R-PO_3H_2$$

wherein
R is phenylene or phenylene substituted by hydroxy, amino or $PO_3H_2$ groups,
or of the formula,

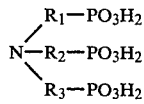

wherein $R_1$, $R_2$, and $R_3$ each independently is a $C_{1-4}$-alkylene group.

7. A method of cooling or of heat-transfer comprising circulating a liquid cooling or heat-transfer medium, wherein the liquid medium is that of claim 1.

8. A method of cooling or of heat-transfer comprising circulating a liquid cooling or heat-transfer medium, wherein the liquid medium is that of claim 2.

9. A method of inhibiting cavitation in a metal in contact with a nonfreezing, cooling and/or heat transfer liquid which comprises including in the liquid a cavitation inhibiting effective amount of at least one phosphonic acid of the formula $$H_2O_3P-R-PO_3H_2$$

wherein
R is phenylene or phenylene substituted by hydroxy, amino or $PO_3H_2$ groups, or of the formula,

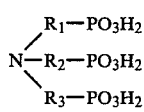

wherein $R_1$, $R_2$, and $R_3$ each independently is a $C_{1-4}$-alkylene group.

* * * * *